United States Patent [19]

Maeda

[11] Patent Number: 5,353,062
[45] Date of Patent: Oct. 4, 1994

[54] METHOD AND APPARATUS FOR DECODING MOVING IMAGES ENCODED BY INTER-FRAME PREDICTION AND DISPLAYING IT

[75] Inventor: Mitsuru Maeda, Yokohama, Japan

[73] Assignee: Canon Kabushiki Kaisha, Tokyo, Japan

[21] Appl. No.: 121,452

[22] Filed: Sep. 16, 1993

Related U.S. Application Data

[63] Continuation of Ser. No. 872,454, Apr. 23, 1992, abandoned.

[30] Foreign Application Priority Data

Apr. 25, 1991 [JP] Japan ................................. 3-095513

[51] Int. Cl.⁵ ..................... H04N 7/130; H04N 7/133; H04N 7/137
[52] U.S. Cl. .................................... 348/412; 348/409
[58] Field of Search ............... 348/409, 411, 412, 415; H04N 7/130, 7/133, 7/137

[56] References Cited
U.S. PATENT DOCUMENTS

| | | | |
|---|---|---|---|
| 4,136,371 | 8/1992 | Savatier et al. | 358/136 |
| 5,086,487 | 2/1992 | Katayama et al. | 382/56 |
| 5,144,425 | 9/1992 | Joseph | 358/136 |
| 5,155,593 | 10/1992 | Yonemitsu et al. | 358/135 |
| 5,212,549 | 5/1993 | Ng et al. | 358/136 |

OTHER PUBLICATIONS

Yamada et al., "International Standardization for Coding of Moving Images, Audio and Multimedia Synchronization", Journal of Institute of Image Electronics Engineers of Japan, vol. 19, No. 4, pp. 236–243 (1990).

*Primary Examiner*—Tommy P. Chin
*Assistant Examiner*—Richard Lee
*Attorney, Agent, or Firm*—Fitzpatrick, Cella, Harper & Scinto

[57] ABSTRACT

A method and apparatus for displaying images is presented in which intra-frame encoding is performed on image data at N frame intervals, where the thinned-out frames are encoded by prediction from the preceding frame codes. The frame being decoded is identified when an instruction for temporarily stopping a moving image and displaying it as a still image is given by an operation panel. If the frame being decoded is not an interpolative frame, the decoded image data is displayed when the decoding operation is complete. If, on the other hand, the frame being decoded is an interpolative frame, the intra-frame encoded frame nearest to the frame being decoded, or a predictive frame, is displayed.

10 Claims, 10 Drawing Sheets

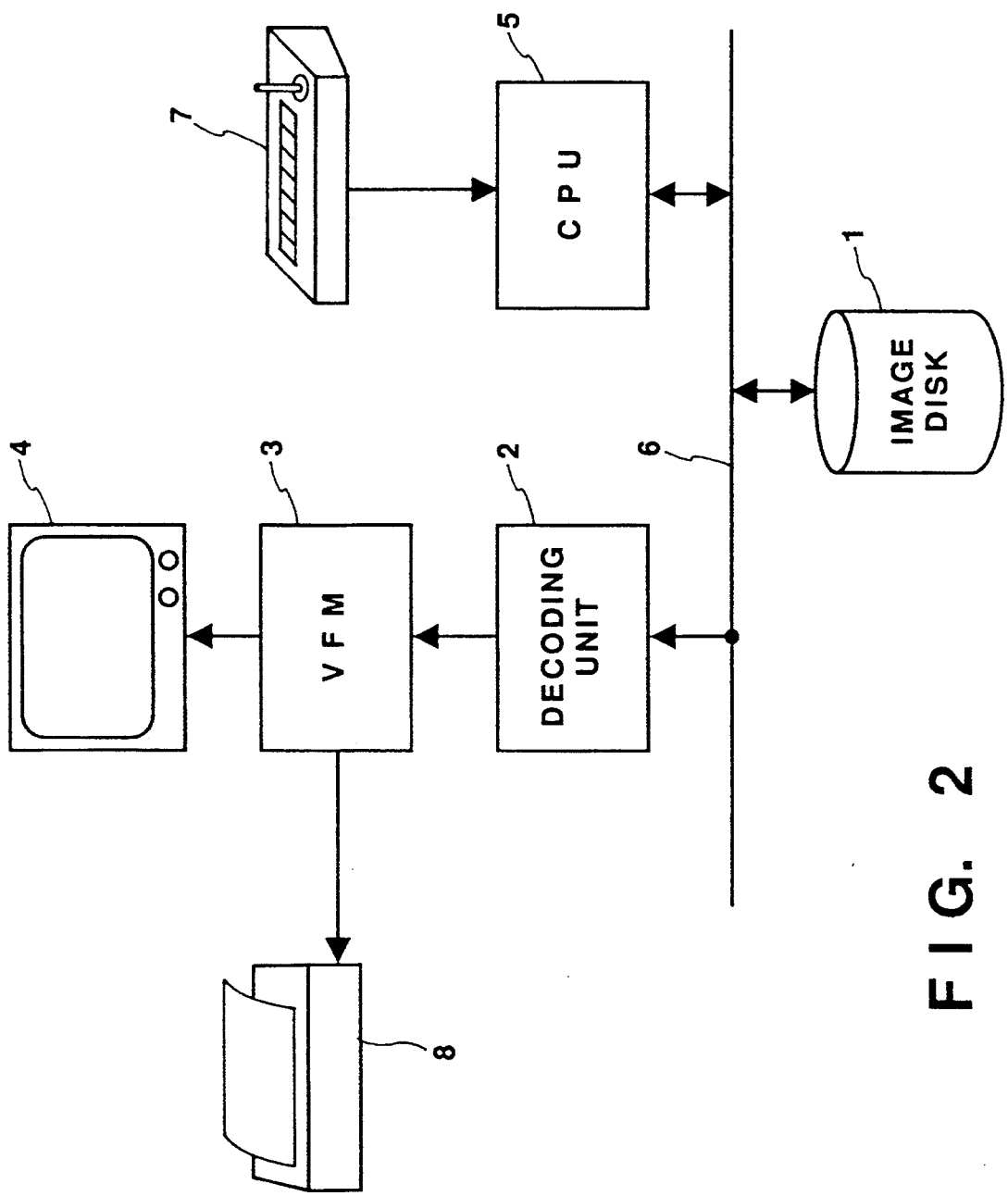
F I G. 2

OVERALL STRUCTURE

| CODE INDICATING INTRA FRAME | RESULT OF QUANTIZATION OF BLOCK | RESULT OF QUANTIZATION OF BLOCK | RESULT OF QUANTIZATION OF BLOCK | . . . . . . | RESULT OF QUANTIZATION |
|---|---|---|---|---|---|

CODE DATA OF INTRA FRAME

FIG. 4B

| CODE INDICATING PREDICTION FRAME | MOTION VECTOR CODE | RESULT OF QUANTIZA-TION | MOTION VECTOR CODE | RESULT OF QUANTIZA-TION | MOTION VECTOR CODE | RESULT OF QUANTIZA-TION | ... | MOTION VECTOR CODE | RESULT OF QUANTIZA-TION |

CODE DATA OF PREDICTION FRAME

F I G. 4C

| CODE INDICATING INTERPOLATIVE FRAME | MOTION VECTOR CODE | TYPE OF MOTION COMPENSATION | RESULT OF QUANTIZATION | MOTION VECTOR CODE | TYPE OF MOTION COMPENSATION | RESULT OF QUANTIZATION | ..... | MOTION VECTOR CODE | TYPE OF MOTION COMPENSATION | RESULT OF QUANTIZATION |
|---|---|---|---|---|---|---|---|---|---|---|

CODE DATA OF INTERPOLATIVE FRAME

F I G. 4D

METHOD AND APPARATUS FOR DECODING MOVING IMAGES ENCODED BY INTER-FRAME PREDICTION AND DISPLAYING IT

This application is a continuation of application Ser. No. 07/872,454 filed Apr. 23 1992, now abandoned.

BACKGROUND OF THE INVENTION

1. Field of the Invention

The present invention relates to a method and apparatus for displaying images while encoded moving data is being decoded.

2. Description Of the Related Art

Before an explanation is given about the prior art, the technical background related to the present invention will be explained. In recent years, moving pictures have come to be encoded and stored in a storage medium. Standardization of such an encoding system is now under way (Reference: The Journal of the Institute of Image Electronics Engineers of Japan, Vol.19, No.4, (1990), pp.236 to 243; Technical Description: International Standardization for Coding of Moving Images, Audio and Multimedia Synchronization by Yamada and Onoe). In this standardization, an intended application is to make it possible to display a stored moving image on a display device. In this standardization, motion compensated adaptive inter-frame prediction is made the basis, prediction errors are transformed by a two-dimensionally discrete cosine transformation (DCT), adaptive and weighted quantization is performed on obtained coefficients, these coefficients are made into a one-dimensional data sequence by zigzag scanning, and this data is encoded by entropy encoding. To improve the quality of displayed images, the frames which are used for encoding only within a frame (called an intra-frame) in a fixed or adaptive manner are inserted. To achieve high-speed reproduction, the frames used for inter-frame prediction (called predictive frames) are inserted at intervals of several frames. The frames between the predictive frames are made into interpolative frames by which motion compensation is performed on the basis of succeeding and preceding predictive frames.

The state of such frames is shown in FIG. 3. In this figure, intra-frames (reference numerals 301 and 302) appear at N frame intervals. In between the N frame intervals, predictive frames (reference numerals 303 and 304) appear at 3 frame intervals. The other frames are interpolative frames. In this figure, each frame is encoded with a block formed of 8×8 pixels as a unit. In the intra-frames, two-dimensional DCT is performed on 8×8 blocks. Weighted quantization is performed on the coefficients. In the predictive frames, two-dimensional DCT is performed by considering the error and the prediction block obtained by performing motion compensation on the basis of the immediately preceding predictive or intra-frame as one block, and weighted quantization is performed on the coefficients. In the interpolative frames, an error among prediction blocks, obtained when performing forward and backward motion compensation and when interpolating both compensations, is determined on the basis of the succeeding and preceding predictive or intra-frames. The smallest error among the blocks of the compensation system is two-dimensionally DCTed, and weighted quantization is performed on the coefficients. Respective quantization results obtained in the above-described way are zigzag scanned, and the obtained one-dimensional information is entropy encoded. Thus, encoded data is obtained.

Therefore, in the intra-frames, a code indicating the result of the quantization of each block is provided after a code indicating the intra-frame. In the predictive frames, a motion vector of each block and a code of the quantization result are provided after a code indicating the predictive frame. In the interpolative frames, a code indicating the motion compensation means selected for each block and a code of the quantization result are provided after the code indicating the interpolative frame.

Generally in the interpolative frames, the image quality decreases because the length of the code is shortened when the quantization width is made larger. Therefore, the amount of encoding allocated during encoding is largest in the intra-frames, the next largest being in the predictive frames. The frames having the smallest number of bits are the interpolative frames.

However, in the above-described prior art, when a moving image is made temporarily still and displayed, images stored in the video frame memory cannot be displayed. In addition, when the display is made temporarily still in the interpolative frames, a problem arises in that the image deteriorates conspicuously because an image of lower quality than that of the other frames is displayed.

SUMMARY OF THE INVENTION

The present invention has been achieved in view of the above-described prior art.

An object of the present invention is to provide a method and apparatus for displaying high-quality still images.

Another object of the present invention is to increase the quality of still images by displaying frames used in motion compensation in the interpolative or predictive frames when an instruction for temporarily stopping a moving image or displaying a still image is given.

A further object of the present invention is to provide a method and apparatus for displaying still images of improved quality by a method wherein the types of motion compensations are counted up and a still image is selected by evaluating the types of these motion compensations in the interpolative frames of low image quality and in the predictive frames.

To achieve the above-described objects, according to the present invention, there is provided an apparatus for displaying images, which performs motion compensation on supplied moving image data by interframe prediction and which displays an image while encoded data obtained by inter-frame encoding is being decoded, comprising: instruction means for instructing that a moving image be temporarily stopped and displayed as a still image; identification means for identifying the frame being decoded when an instruction for displaying a still image is given by the instruction means; and display means for displaying the intra-frame encoded frame near the frame being decoded when it is determined by the identifying means that the frame is an interpolative frame.

To achieve the above-described objects, according to the present invention, there is provided a method for displaying images, in which motion compensation by inter-frame prediction is performed on supplied moving image data and said data is displayed while encoded data obtained by intra-frame encoding is being decoded in arbitrary frames of the moving image, comprising the steps of: identifying the frame in which decoding is in progress when an instruction for temporarily stopping a moving image and displaying a still image is given; displaying the decoded image data upon completion of the decoding of the frame being decoded when it is determined by the identifying means that the frame is not an interpolative frame; and displaying the encoded frame obtained by performing intra-frame encoding nearest in time when it is determined by the identifying means that the frame is an interpolative frame.

Other features and advantages of the present invention will be apparent from the following description taken in conjunction with the accompanying drawings, wherein like reference characters designate the same or similar parts throughout the figures thereof.

BRIEF DESCRIPTION OF THE DRAWINGS

FIG. 2 is a block diagram schematically illustrating the construction of an image display system configuration according to the first embodiment of the present invention;

FIGS. 4A-4D are view illustrating the structures of ordinary code data;

DETAILED DESCRIPTION OF THE PREFERRED EMBODIMENTS

Preferred embodiments of the present invention will be explained below in detail with reference to the accompanying drawings. [Explanation of an image display system (FIGS. 1 and 2)]

Figure 1:
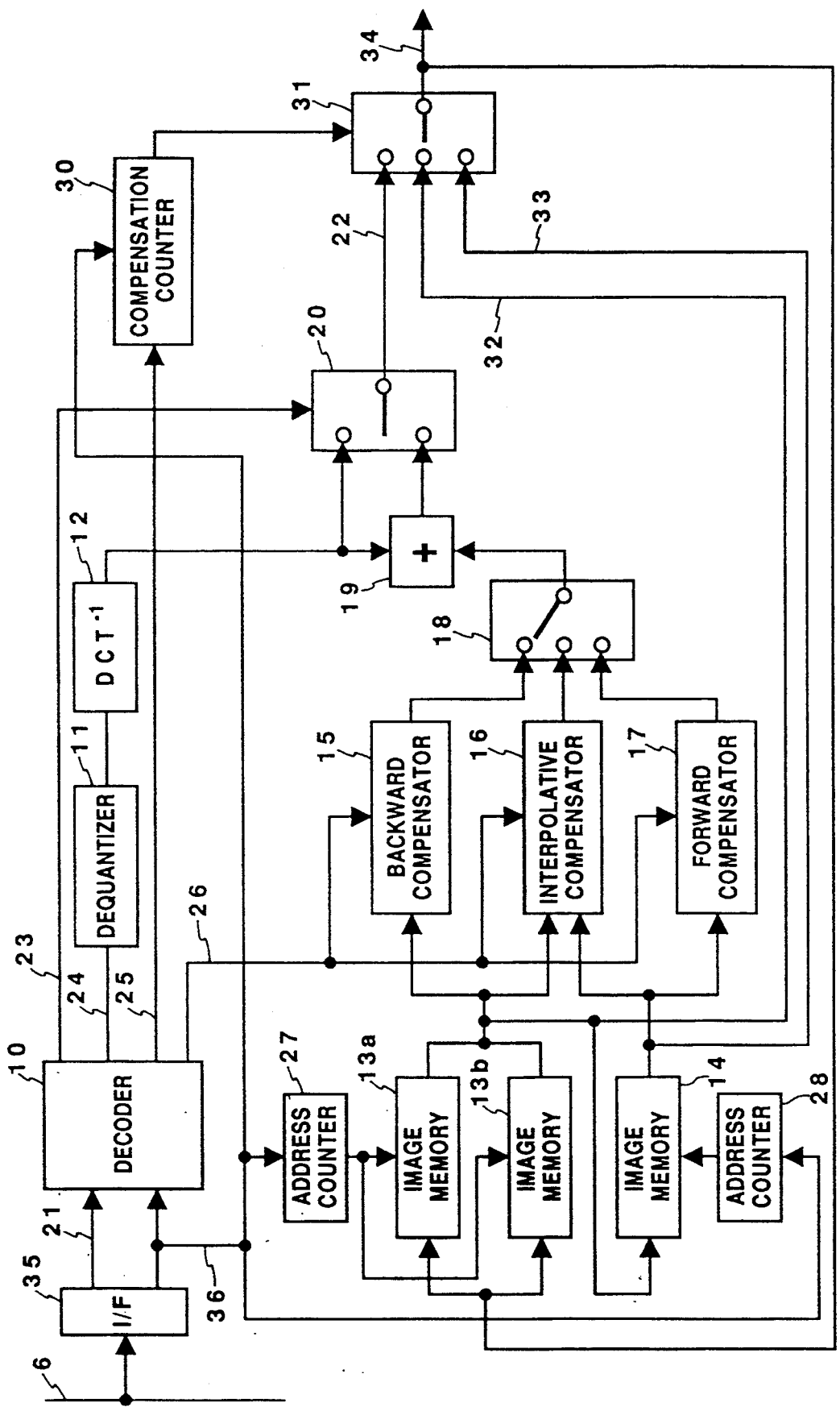
FIG. 1 is a block diagram illustrating the construction of a decoding unit according to a first embodiment of the present invention.

FIG. 2 is a block diagram schematically illustrating the construction of an image display system according to the first embodiment of the present invention. FIG. 1 is a block diagram illustrating the detailed construction of a decoder of the image display system.

In FIG. 2, reference numeral 1 denotes a disk device for storing code data obtained by encoding moving images; reference numeral 2 denotes a decoding unit, the details of which will be described later with reference to FIG. 1; reference numeral 3 denotes a video frame memory (VFM) in which image data to be displayed on a display monitor 4 is stored; reference numeral 4 denotes a display monitor; reference numeral 5 denotes a CPU for controlling the entire system; reference numeral 6 denotes a system bus through which code data and control signals from the CPU 5 are transferred; reference numeral 7 denotes an operation panel via which various kinds of instruction information is input by operators. As a result of such input, the operator can display a still image on the display monitor 4 by selecting image data to be displayed by using the operation panel 7 and depressing a switch of the operation panel 7 when the image data is displayed as a still image.

When the image to be displayed is selected via the operation panel 7, the CPU 5 reads out corresponding code data from the disk 1 and inputs it to the decoding unit 2 through the system bus 6. Thereupon, the decoding unit 2 reproduces the image data and outputs it to the video frame memory 3 where the image data is stored. The stored image data is converted from digital form to analog form and displayed on the display monitor 4 as a moving image.

In contrast, when a still image display is instructed via the operation panel 7, the CPU 5 temporarily stops the reading of the code data from the disk 1 and instructs the decoding unit 2 to temporarily stop decoding. At this time, the decoding unit 2 sends out a still image to the video frame memory 3 so that the still image is displayed on the display monitor 4. Reference numeral 8 denotes a video printer for printing the contents of the video frame memory 3.

FIG. 1 is a block diagram illustrating the detailed construction of the decoding unit 2.

In FIG. 1, reference numeral 10 denotes a decoder for decoding input code data; reference numeral 11 denotes a dequantizer for dequantizing decoded data; reference numeral 12 denotes an inverse discrete cosine transformer (IDCT) for performing inverse discrete cosine transformation; reference numerals 13a, 13b and 14 each denote an image memory for storing image data which is decoded and reproduced. Image memories 13a and 13b are alternately switched and an access is made thereto so that when one memory is written, the other is read out. Reference numeral 15 denotes a backward compensator for performing backward compensation; reference numeral 16 denotes an interpolative compensator for performing motion compensation by interpolating the result of the motion compensation on the basis of the succeeding and the preceding frames; reference numeral 17 denotes a forward compensator for performing forward compensation; reference numeral 18 denotes a selector which selects any one of the outputs of compensators 15 to 17 on the basis of a selection signal 26 from the decoder 10; reference numeral 19 denotes an adder; reference numeral 20 denotes a selector for selecting the output of either the dequantizer 12 or the adder 19; and reference numerals 27 and 28 denote each an address counter for performing input/output and address management of the image memories 13a, 13b and 14.

Reference numeral 30 denotes a compensation counter for counting the number of times motion compensation appears within a frame, that is, forward compensation, backward compensation and interpolative compensation, when the interpolative frames are decoded; reference numeral 31 denotes a selector which selects any one of the output of the selector 20, and the outputs of the image memories 13a, 13b and 14 depending upon the output value of the compensation counter 30 and outputs it to the video frame memory 3 at a later stage; and reference numeral 35 denotes an interface (I/F) section with the system bus 6.

The operation of the decoding unit 2 constructed as described above according to this embodiment will be explained below.

When an image to be displayed on the display monitor 4 is selected by an input via the operation panel 7, the CPU 5 reads out the code data of the selected image from the image disk 1 and outputs the code data to the decoding unit 2 through the system bus 6. At this time, the CPU 5 further instructs the decoding unit 2 to decode the code data and begin the display. The code data input to the decoding unit 2 through the system bus 6 is input to the interface section 35 and input to the decoder 10 through a data line 21.

The code data input through the interface section 35 is input to the decoder 10 over the data line 21. The decoder 10 decodes the code data used to select the type of frame, quantization result, motion vector and motion compensator from among the input code data and outputs it through data lines 23, 24, 25 and 26.

When the code data indicates an intra-frame, the quantization result is input through a data line 24 to the dequantizer 11, in which the code data is dequantized and reconstructed to a DCT coefficient. The inverse discrete cosine transformer 12 performs inverse DCT on the DCT coefficient to reconstruct a pixel value. At this time, since a code indicating an intra-frame has been input to the selector 20 through the data line 23, the selector 20 selects the output from the inverse discrete cosine transformer 12 and outputs to a succeeding selector 31. In the case of the intra-frame, since the compensation counter 30 outputs a selection signal at all times such that the selector 31 selects signals on the data line 22 and outputs to a data line 34, the reproduced image outputted from the inverse discrete cosine transformer 12 is output to the video frame memory 3 through the data line 34 and displayed on the display monitor 4. In other words, the output of the selector 31 is stored in the video frame memory 3. After color conversion from digital form to analog form is performed by an unillustrated color converter, the reproduced image is displayed on the display monitor 4. The pixels reconstructed in the above-described way and outputted from the selector 31 are stored in the image memories 13a and 13b under the control of the address counter 27.

Next, the case in which the code data specifies the predictive frame will be explained. First, the contents of the image memory 13a or 13b are transferred to the image memory 14 by operating the address counters 27 and 28. Code data inputted from the system bus 6 via the interface section 35 is decoded by the decoder 10. Dequantization and inverse DCT are performed on the quantization result to reproduce a prediction error. This reproduced prediction error is output to the adder 19 and the selector 20. When a motion vector from the decoder 10 is sent to the forward compensator 17 over the data line 26, a motion compensation block is created from the image memory 14. This motion compensation block is input to the selector 18. At this time, since a signal indicating the predictive frame is input to the selector 18 through the data line 26, the output of the forward compensator 17 is constantly output to the adder 19 during the decoding in the predictive frames.

The adder 19 adds the motion compensation block to the prediction error reproduced by the inverse discrete cosine transformer 12, and outputs it to the selector 20. In this case, the selector 20 sends out the output of the adder 19 to the selector 31. In the case of the predictive frames, since the counter 30 instructs the selector 31 to select the signals of the data line 22 and output them to the data line 34, the reproduced image data from the adder 19 is sent out to the video frame memory 3 through the data line 34 and displayed on the display monitor 4. At the same time as the reproduced image data is displayed, it is written into one of either the image memory 13a or 13b.

Next, the case in which the code data specifies the interpolative frame will be explained. Code data inputted from the system bus 6 via the interface section 35 is decoded by the decoder 10. The quantization result is further dequantized and inverse DCTed to reproduce a prediction error. This prediction error is output to the adder 19. A motion vector outputted through the data line 26 from the decoder 10 is inputted to each of the compensators 15 to 17. Each of these compensators creates a motion compensation block on the basis of the image data from the image memory 13a or 13b and the image memory 14. These results are input to the selector 18.

The selection signal of the selector 18 is input to the selector 18 and the compensation counter 30 from the decoder 10 through the data line 25, which selection signal indicates which one of a forward, backward or interpolative compensation the motion compensation of the relevant block is. The counter 30 is reset by this signal to "0" at the time the decoding in the interpolative frames is started, and counts up the number of each type of motion compensation. The selector 18 selects the output from the compensators 15 to 17 corresponding to the types of the motion compensation and outputs it to the adder 19. As a result, the adder 19 adds the motion compensation block to the prediction error from the inverse discrete cosine transformer 12, and sends it out to the selector 20. Thereupon, the selector 20 selects the output of the adder 19 because a signal indicating the interpolative frame is inputted to the selector 20 through the data line 23, and outputs it to the selector 31. In the case of the interpolative frames, since the counter 30 outputs a selection signal to the selector 31 instructing that the signals of the data line 22 be selected and output to the data line 34, the reproduced image data from the adder 19 is output to the video frame memory 3 through the data line 34 and displayed on the display monitor 4.

Figure 3:
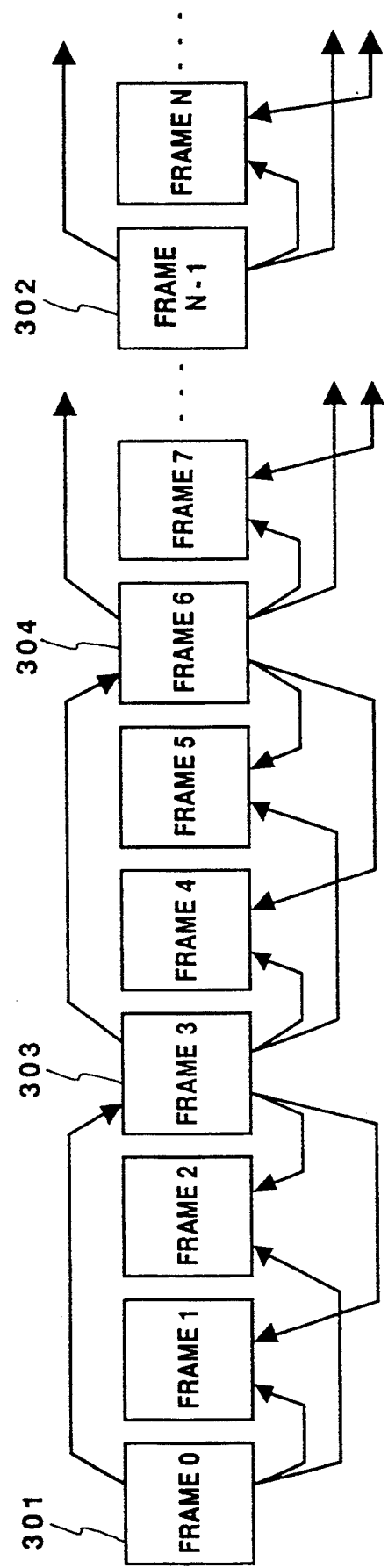
FIG. 3 is a view illustrating an example of frame structure according to the first embodiment of the present invention.
Figure 4A:
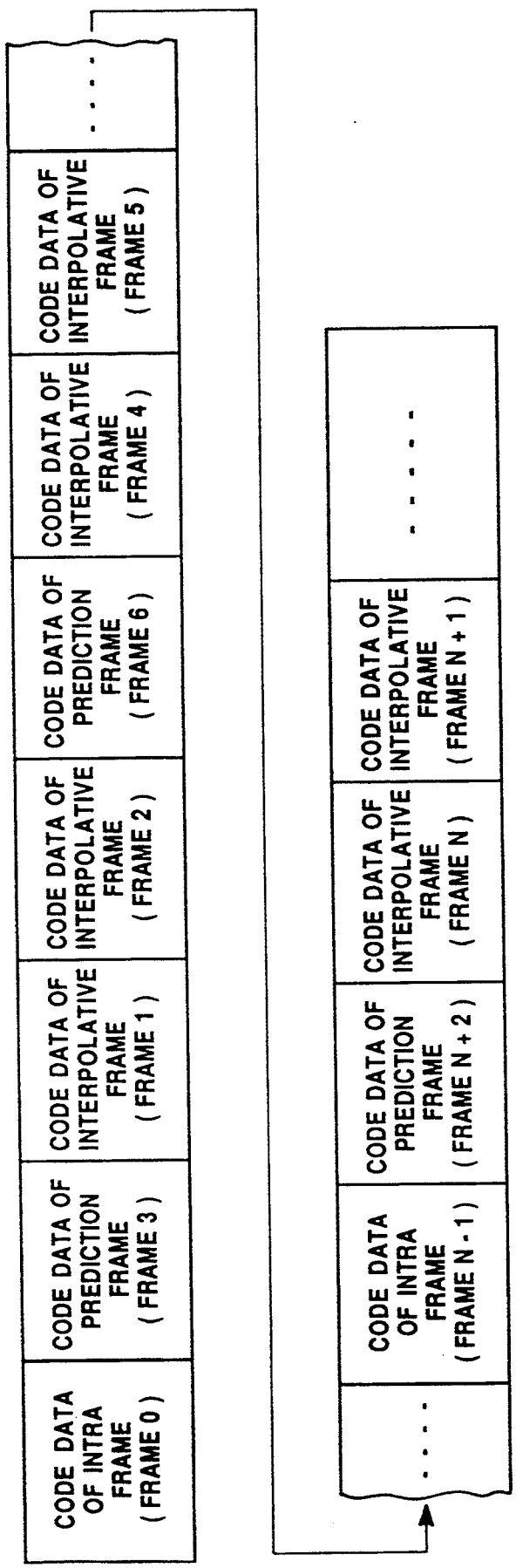

FIGS. 4A–4D show the structures of the encoded data resulting from the encoding of the frame shown in FIG. 3 in the above-described way. FIG. 4A shows the encoded codes in their entirety; FIG. 4B shows the code data of the intra-frame; FIG. 4C shows the code data of the predictive frame; and FIG. 4D shows the code data of the interpolative frame.

Generally, in the interpolative frames, the image quality decreases because the length of the code is shortened while the quantization width is made larger. Therefore, the amount of code allocated during encoding is largest in the intra-frames, the next largest being in the predictive frames. The frames having the smallest number of bits are the interpolative frames.

Next, a case in which an instruction for displaying a still image is given via the operation panel 7 will be explained.

After the CPU 5 outputs the code data of the frame being sent out to the disk 1 via the system bus 6, it stops the reading out of the code data. Furthermore, the CPU 5 instructs the decoding unit 2 to display a still image. The instruction for displaying the still image outputted via the system bus 6 is input to the decoder 10 and at the same time output to the data line 36 via the interface section 35.

At this time, if the intra-frame is being decoded, the decoder 10 stops the decoding operation when the decoding of this frame is completed. Consequently, from this time on, the reproduced image data of the intra-frames is stored in the video frame memory 3 and displayed.

If the predictive frame is being decoded at the above time, the decoding is stopped when the decoding in the frame is completed in the same manner as in the case of the intra-frames. Consequently, a reproduced image of the predictive frames is stored in the video frame memory 3 and displayed.

If the interpolative frame are being decoded at the above time, the decoding is stopped when the decoding in this frame is completed. Upon the inputting of the signal of the still image display to the compensation counter 30 via the bus interface section 35, the counted-up value of each of the motion compensations which have occurred in this frame is evaluated when the decoding is completed as set forth below:

(1) in the case where the occurrence of forward compensation is most frequent, the compensation counter 30 outputs a selection signal such that the selector 31 selects the output (the nearest intra or predictive frame in the backward direction) of the data line 33, (2) in the case where the occurrence of backward compensation is most frequent, the compensation counter 30 outputs such a selection signal that the selector 31 selects the output (the nearest intra or predictive frame in the forward direction) of the data line 32, and (3) in the case where the occurrence of interpolative compensation is most frequent, the compensation counter 30 outputs such a selection signal that the output of the data line 32 or 33 from the image memory 13a, 13b or 14 in which the image data of the intra or predictive frame which is nearest in time is stored, is selected.

The selector 31 selects one of either the data line 32 or 33 in response to such a selection signal from the compensation counter 30. Image data is read out to the selected data line under the control of the address counter 27 corresponding to each of the image memories 13a, 13b and 14. This image data is stored in the video frame memory 3 and displayed. This still image data can be printed out by the video printer 8.

Next, when the still image display is released by an instruction from the operation panel 7, the CPU 5 instructs the disk 1 and the decoding unit 2 via the system bus 6 as set forth below:

(1) In the case where an instruction for displaying the still image was given during the decoding in the intraframes, the CPU 5 instructs the disk 1 and the decoding unit 2 to read out the code data of the next predictive frame and restart the decoding operation, respectively, (2) In the case where the still image display was instructed during the decoding in the predict ire frames, the CPU 5 instructs the disk 1 and the decoding unit 2 to read out code data of the next interpolative frame and restart the decoding operation, respectively, and (3) In the case where an instruction for displaying the still image was given during the decoding in the interpolative frames, when the image data of the image memory 13a or 13b is stored in the video frame memory 3 and displayed, the CPU 5 instructs the disk 1 and the decoding unit 2 to read out the code data of the next interpolative frame and restart the decoding operation, respectively.

In the case where the image data of the image memory 14 is stored in the video frame memory 3 and displayed, the CPU 5 instructs the disk 1 to restart reading out sequentially, starting from the code data of the predictive frame immediately preceding the displayed frame, or of the interpolative frame after the code data of the intra-frame. At this time, the CPU 5 also instructs the decoding unit 2 to restart decoding, starting from the code data of the interpolative frame.

Flowcharts for showing the operations of the decoder 10 and the compensation counter 30 described above are shown in FIGS. 5 and 6.

Figure 5:
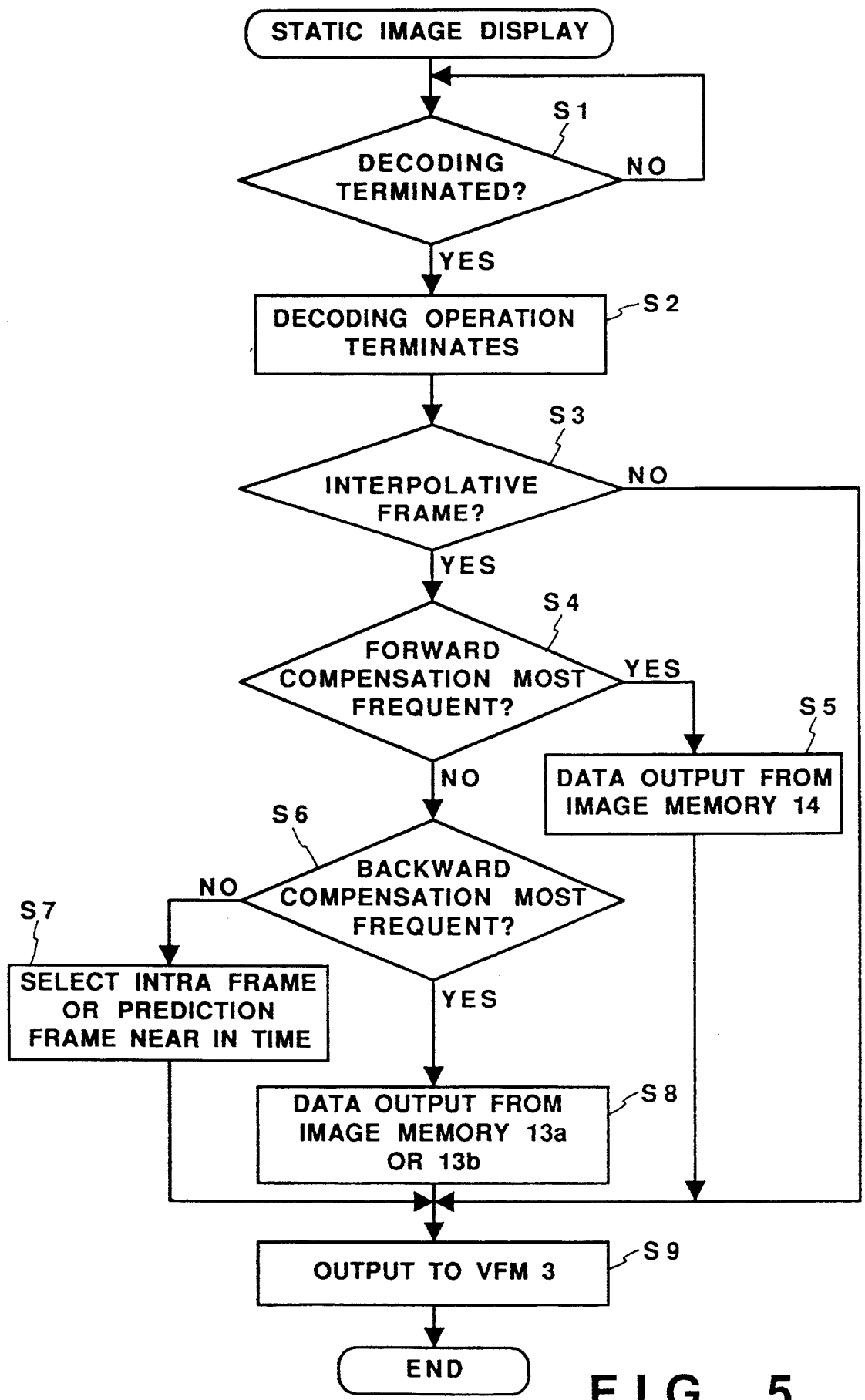
FIG. 5 is a flowchart illustrating an operation for displaying a still image according to the first embodiment of the present invention.

The flowchart shown in FIG. 5 shows the operation when an instruction for displaying a still image is given. When an instruction for displaying a still image is given via the operation panel 7, the process proceeds to step S1 where a check is made to determine whether a decoding operation is in process. When a decoding operation is in process, after the decoding operation in the frame is completed, the process proceeds to step S2 where the decoding operation is stopped. In step S3, a check is made to determine whether a decoding operation for an interpolative frame is being performed. If a decoding operation for an interpolative frame is not being performed, since a decoding operation for an intra or predictive frame is being performed, the decoded image is output as it is to the video frame memory 3 and displayed (step S9).

On the other hand, when a decoding operation for an interpolative frame is being performed in step S3, the process proceeds to step S4 where a check is made to determine based on the value of the compensation counter 30, whether the occurrence of the forward compensation is most frequent. When the forward compensation is most frequent, the process proceeds to step S5 where the image data stored in the image memory 14, that is, an intra-frame or predictive frame in the forward direction, is output. If the occurrence of the backward compensation is most frequent in step S6, the process proceeds to step S8 where the image data stored in the image memory 13a or 13b, that is, the predictive frame or intra-frame positioned in the backward direction nearest to the interpolative frame, is output. If neither the occurrence of the forward compensation nor that of the backward compensation is most frequent in step S6, it is assumed that the decoding of the interpolative frames is most frequent, and the process proceeds to step S7 where the output from the image memory 13a or 13b in which the image data of either the intra or predictive frame nearest in time is stored, or from the image memory 14, is selected and output. Next, in step S9, this image data is stored in the video frame memory 3 and displayed on the display monitor 4.

Figure 6:
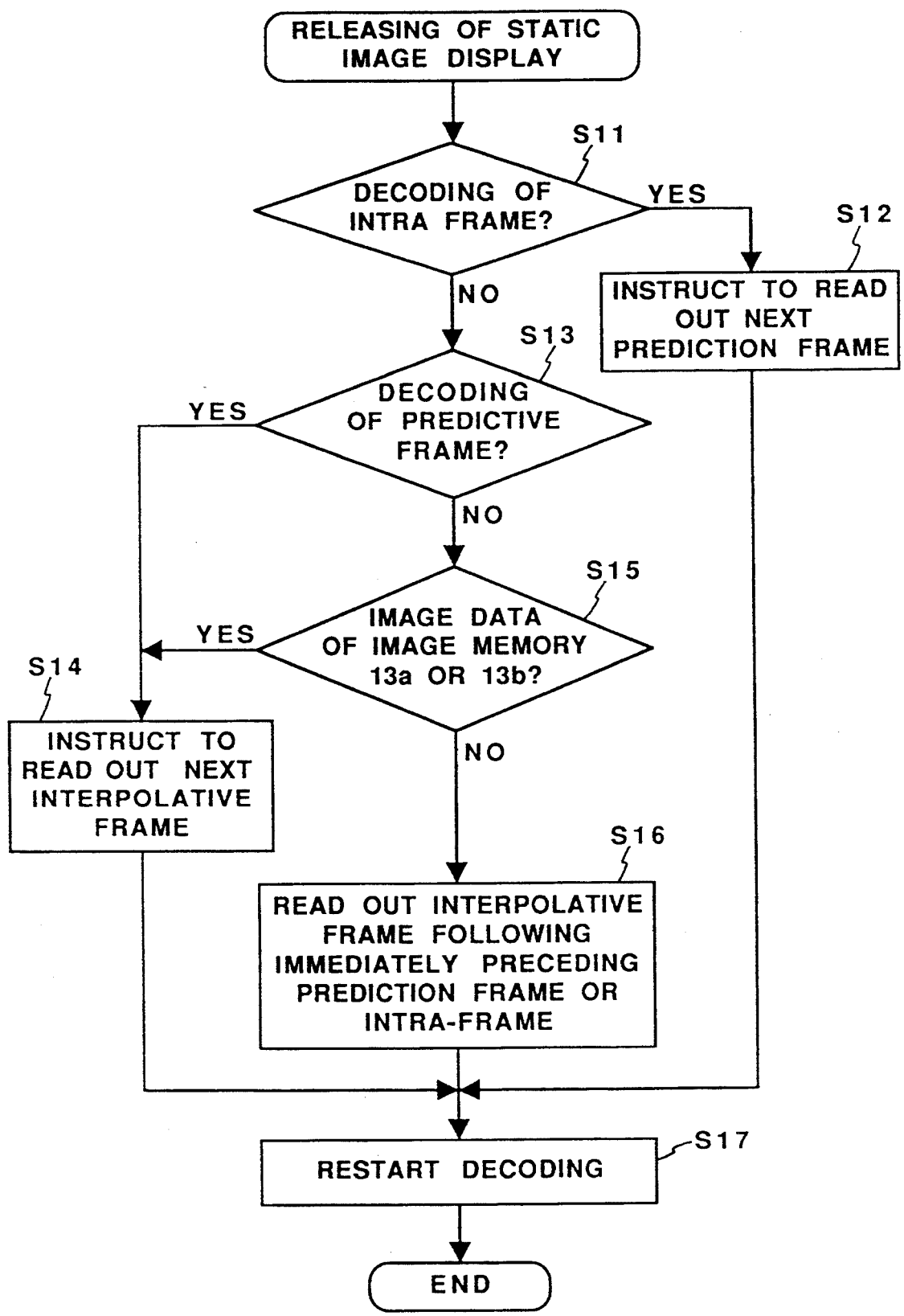
FIG. 6 is a flowchart illustrating an operation for releasing a still image display according to the first embodiment of the present invention.

FIG. 6 is a flowchart illustrating the operation when an instruction for releasing the still image display is given via the operation panel 7.

If an instruction for displaying a still image was given during the decoding of the intra-frame in step S11, the process proceeds to step S12 where an instruction for reading out the code data of the next predictive frame is given. If an instruction for displaying a still image was given during the decoding of the predictive frame in step S13, the process proceeds to step S14 where an instruction for reading out the code data of the next interpolative frame is given. On the other hand, if an instruction for displaying a still image is given during the decoding of the interpolative frame, the process proceeds to step S15 where a check is made to determine whether the image of the image memory 13a or 13b is displayed. When the image of the image memory 13a or 13b is displayed, that is, when the backward compensation is most frequent, the process proceeds to step S14 where an instruction for reading out the code data of the next interpolative frame is given. That is, when the forward compensation is most frequent, the process proceeds to step S16 where code data is read out from a predictive frame immediately preceding the frame being displayed currently or from an interpolative frame after the intra-frame, and the process proceeds to step S17.

In the above-described embodiment, during the decoding of the interpolative frames, a larger value of the counted values of the forward and backward compensations from the compensation counter 30 is selected, and the output of the selector 31 may be switched, for example, only on the basis of the above-described evaluations (1) and (2).

The frame structure is not limited to that of the above-described embodiment. For example, only intra-frames and interpolative frames, or only intra-frames or predictive frames, may be used for the frame structure. In the case of only intra-frames or predictive frames, the immediately preceding intra-frame is read out, but an intra-frame nearer in time may be selected.

Figure 7:
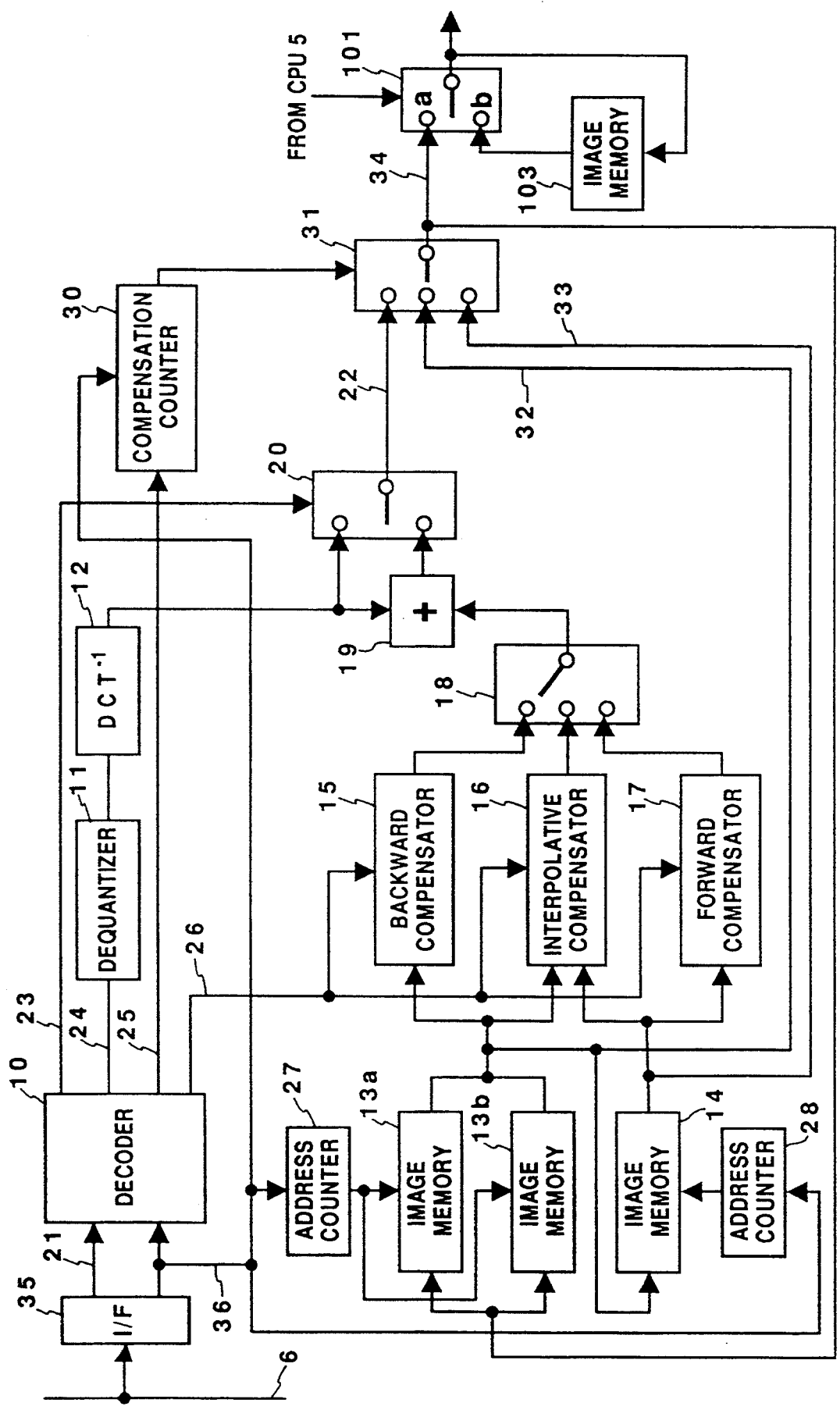
FIG. 7 is a block diagram illustrating the construction of a decoding unit according to a second embodiment of the present invention.

FIG. 7 is a block diagram illustrating the construction of a decoder according to a second embodiment of the present invention. Those parts in FIG. 7 which are the same as the corresponding parts in FIG. 1 are given the same reference numerals, and the explanation thereof is omitted.

In this embodiment, in addition to the components of the above-described embodiment, a switch circuit 101 and an image memory 103 are provided. With this construction, when code data inputted from the system bus 6 is decoded in real-time and displayed, the switch circuit 101 is switched to side "a". When an instruction for displaying a still image is given in this condition, upon completion of the decoding operation for image data of one screen of the intra or predictive frame, the decoded data is written into the image memory 103. In this way, the switch circuit 101 is switched to side "b". As a result, the image data of one screen stored in the image memory 103 is read out repeatedly as still image information and output through the switch circuit 101. The image information is stored in the video frame memory 3 and displayed on the display monitor 4.

In this condition, the other parts of the decoder perform the decoding operation in real-time. If the still image display is released, the display can be changed to the original normal moving image display by merely switching the switch circuit again to the terminal "a".

In the second embodiment shown in FIG. 7, the image data is not data read out from the image disk 1, but, for example, is image data supplied by video telephones, radio broadcasting or the like. As a consequence, according to this embodiment, complex operations shown in the flowcharts shown in FIGS. 5 and 6 are unnecessary.

The present invention may be applied to a system formed of a plurality of appliances, or an apparatus formed of one appliance. It goes without saying that the present invention can be applied to a system or apparatus whose objects can be achieved by supplying programs thereto on the basis of which the present invention is carried out.

According to these embodiments, as described above, in the interpolative frames having low image quality and predictive frames, a still image is selected by counting up the type of a motion compensation and evaluating the type of these motion compensations. As a result, there is an advantage in that the quality of a still image can be increased, since predictive frames having a high image quality and intra-frames can be reproduced and displayed as a still image.

According to the present invention, as described above, when an instruction for temporarily stopping a moving image and displaying a still image is given, there is an advantage in that the quality of the still image can be increased by displaying frames used for motion compensations in the interpolative frames and predictive frames.

As many apparently widely different embodiments of the present invention can be made without departing from the spirit and scope thereof, it is to be understood that the present invention is not limited to the specific embodiments thereof except as defined in the appended claims.

What is claimed:

1. An apparatus for displaying images which performs motion compensation by inter-frame prediction on supplied moving image data and displays it while encoded data obtained by intra-frame encoding within arbitrary frames of a moving image is being decoded, comprising:
   decoding means for decoding encoded moving image data;
   instruction means for instructing that a moving image be temporarily stopped and displayed as a still image;
   identifying means for identifying frame which is being decoded by said decoding means when an instruction for displaying a still image is given by said instruction means; and
   display means for displaying an intraframe encoded frame near the frame being decoded by said decoding means when the frame being decoded is identified as being an interpolative frame by said identifying means.

2. An apparatus for displaying images according to claim 1, wherein said intra-frame encoding is performed on said encoded data at N frame intervals, thinned-out frames being encoded by prediction on the basis of the preceding frame codes.

3. An apparatus for displaying images according to claim 1, wherein said display means displays the frame when it is determined by the identifying means that the frame is not an interpolative frame.

4. An apparatus for displaying images according to claim 1, wherein said display means displays the nearest intra or predictive frame in the backward direction if the occurrence of forward compensation is most frequent, when it is determined by said identifying means that the frame is an interpolative frame.

5. An apparatus for displaying images according to claim 1, wherein said display means displays the nearest intra or predictive frame in the forward direction if the occurrence of backward compensation is most frequent, when it is determined by said identifying means that the frame is an interpolative frame.

6. An apparatus for displaying images according to claim 1, wherein said display means displays the intraframe encoded frame or a predictive frame nearest to an interpolative frame if the occurrence of interpolative compensation is most frequent, when it is determined by said identifying means that the frame is the interpolative frame.

7. An apparatus for displaying images according to claim 1, further comprising:
   storage means for storing image data to be output to said display means; and
   selection means for selecting one of either said image data from the storage means or decoded image data decoded by said decoding means and causing said display means to display it,
   wherein, when an instruction for displaying a still image is given by said instruction means, the intra-frame encoded frame or a predictive frame is stored in said storage means and selected by said selection means to be displayed by said display means, and when the displaying of a still image is terminated, the image data decoded by said decoding means is selected and displayed.

8. A method for displaying images in which motion compensation by an inter-frame prediction is performed on an intra-frame of supplied moving image, comprising the steps of:
   decoding encoded moving image data and displaying a moving image;
   identifying a frame of said moving image data being decoded when an instruction for temporarily stopping the moving image and displaying it as a still image is given; and
   displaying an intra-frame encoded frame near the frame being decoded when it is identified that the frame being decoded is an interpolative frame.

9. A method for displaying images in which motion compensation by an inter-frame prediction is performed on an intra-frame of supplied moving image data, comprising the steps of:
   decoding encoded moving image data and displaying a moving image;
   identifying a frame of said moving image data being decoded when an instruction for temporarily stopping the moving image and displaying it as a still image is given;
   displaying the decoded image data upon the completion of the decoding in the frame being decoded if it is determined that the frame being decoded is not an interpolative frame; and
   displaying an encoded frame obtained by performing an intra-frame encoding nearest in time if it is determined that the frame being decoded is an interpolative frame.

10. A method for displaying images in which motion compensation by inter-frame prediction is performed on an intra-frame of supplied moving image data, comprising the steps of:
   decoding encoded moving image data and displaying a moving image;
   identifying a frame of said moving image data being decoded when an instruction for temporarily stopping the moving image and displaying it as a still image is given;
   storing decoded image data of the frame being decoded into a memory if it is identified that the frame being decoded is not an interpolative frame;
   storing decoded image data upon the occurrence of a frame other than an interpolative frame into the memory if it is identified that the frame being decoded is an interpolative frame; and
   displaying repeatedly the decoded image data stored in the memory.

* * * * *

UNITED STATES PATENT AND TRADEMARK OFFICE
CERTIFICATE OF CORRECTION

PATENT NO. : 5,353,062
DATED : October 4, 1994
INVENTOR(S) : MITSURU MAEDA

It is certified that error appears in the above-identified patent and that said Letters Patent is hereby corrected as shown below:

ON TITLE PAGE

In [56] References Cited, under U.S. PATENT DOCUMENTS:
"4,136,371  8/1992  Savatier et al." should read
--5,136,371  8/1992  Savatier et al.--.

COLUMN 1

Line 14, "Of" should read --of--.

COLUMN 2

Line 50, "interframe" should read --inter-frame--.

COLUMN 3

Line 28, "view" should read --views--.
Line 44, "drawings. [Explanation" should read
--drawings. ¶ [Explanation--.

COLUMN 4

Line 25, "( IDCT )" should read --(IDCT)--.
Line 43, "dequantizer 12" should read --inverse discrete cosine transformer 12--.

COLUMN 7

Line 7, "are" should read --is--.
Line 18, "intra or" should read --intra- or--.
Line 24, "intra or" should read --intra- or--.
Line 32, "intra or" should read --intra- or--.
Line 48, "intraframes," should read --intra-frames,--.
Line 53, "predict ire" should read --predictive--.

UNITED STATES PATENT AND TRADEMARK OFFICE
CERTIFICATE OF CORRECTION

PATENT NO.   : 5,353,062
DATED        : October 4, 1994
INVENTOR(S)  : MITSURU MAEDA It is certified that error appears in the above-identified patent and that said Letters Patent is hereby corrected as shown below:

<u>COLUMN 8</u>

Line 22, "intra" should read --intra- --.
   Line 46, "intra or" should read --intra- or--.

<u>COLUMN 9</u>

Line 38, "intra or" should read --intra- or--.

<u>COLUMN 10</u>

Line 19, "claimed:" should read --claimed is:--.
   Line 31, "frame" should read --a frame--.
   Line 35, "intraframe" should read --intra-frame--.
   Line 51, "intra or" should read --intra- or--.
   Line 58, "intra or" should read --intra- or--.

Signed and Sealed this

Seventh Day of March, 1995

Attest:

BRUCE LEHMAN

*Attesting Officer*   *Commissioner of Patents and Trademarks*